United States Patent [19]
Majumdar et al.

[11] Patent Number: 5,904,792
[45] Date of Patent: *May 18, 1999

[54] SOLVENTLESS TREAD MARKING

[75] Inventors: Ramendra Nath Majumdar, Hudson; Michael Alois Kolowski, Mogadore, both of Ohio

[73] Assignee: The Goodyear Tire & Rubber Company, Akron, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/812,643

[22] Filed: Mar. 7, 1997

[51] Int. Cl.⁶ ..................................................... B29D 30/52
[52] U.S. Cl. .................. 156/128.6; 156/123; 156/130.5; 156/231; 156/289
[58] Field of Search ................................ 156/116, 110.1, 156/123, 128.6, 230, 231, 234, 235, 236, 238, 240, 289, 241, 30.5; 428/41.6, 42.1, 352, 914, 202; 152/524, 209 R

[56] References Cited

U.S. PATENT DOCUMENTS

| | | | |
|---|---|---|---|
| 38,686 | 5/1863 | Lewis | 156/240 |
| 1,496,753 | 6/1924 | Burkley | 156/236 |
| 1,597,602 | 8/1926 | Klein | 156/241 |
| 2,188,866 | 1/1940 | Poschel | 428/914 |
| 2,316,149 | 4/1943 | Bates | 156/238 |
| 2,416,844 | 3/1947 | Reese | 428/914 |
| 3,577,261 | 5/1971 | Klar . | |
| 4,684,420 | 8/1987 | Bryant et al. | 156/116 |
| 5,047,110 | 9/1991 | Bryant et al. | 156/230 |
| 5,175,203 | 12/1992 | Kansupada et al. . | |
| 5,284,715 | 2/1994 | Kansupada et al. . | |
| 5,320,874 | 6/1994 | Kansupada et al. . | |
| 5,527,407 | 6/1996 | Gartland et al. . | |

OTHER PUBLICATIONS

Abstracts from Chemical Abstracts and Derwent of Japanese Patent 62072773 A2, issued Apr. 3, 1987.
English Language Abstract of Japanese Patent 8199005 A, published Jul. 6, 1996.

*Primary Examiner*—Geoffrey L. Knable
*Attorney, Agent, or Firm*—Henry C Young, Jr.

[57] ABSTRACT

A carbon black filled crosslinkable rubber composition can be marked or identified with a contrasting colored crosslinkable composition. The colored crosslinkable composition is desirably thin (e.g. about 0.1 to about 10 mil thick) and is substantially free of solvent. To facilitate mechanized application of the colored crosslinkable composition it is applied from a releasable material in the form of film, filament or fiber that can be reused or recycled.

6 Claims, No Drawings

SOLVENTLESS TREAD MARKING

FIELD OF THE INVENTION

This invention relates to a colored marking component added to the surface of an uncured rubber composition to identify the uncured rubber composition with respect to the components in the rubber composition or the intended use of the rubber composition or both. In a preferred embodiment the colored marking component is one or more colored markings extending along the length or width of the rubber composition to visually identify the composition.

BACKGROUND

Carbon black filled rubber compositions in a tire building plant are desirably identified so that a preselected tread compound is applied to each tire type. Tread identification is also used to confirm at specified time intervals that the correct tread compound is being applied to the appropriate tire type. If the identification is applied to the outside of the tread and if the identification is designed to remain during tire curing (vulcanization), then the tire tread composition can be identified by visual inspection.

Tire manufacturers use inks (pigment, binder, and solvent) to identify the one or more tread compositions within a tire building plant. Often the ink is applied longitudinally along the hot tread after it is shaped by molding or extruding. Subsequently the tread is cooled (e.g. with a water spray) and put into inventory or cut to length and assembled into tires. The solvent in the ink is unfortunately volatilized into the work place unless collected by expensive solvent recovery systems. Solvent based inks have been particularly successful due to their fast drying times, resistance to water spray, durability, good substrate wetting, good adhesion to the substrate, and the visibility of the resulting coating. It is also important that the color does not transfer to the mold during the curing step.

SUMMARY OF THE INVENTION

A laminate is described for marking a carbon black filled crosslinkable rubber composition along with a process for using the laminate to mark (identify) a carbon black filled crosslinkable rubber composition. The laminate comprises a releasable layer and one or more thin colored crosslinkable markings which can be transferred from the releasable material to a carbon black filled crosslinkable rubber composition. The colored markings comprise natural rubber and/or least one synthetic diene or isobutylene based elastomer or combinations thereof, at least one colored pigment, and sulfur or at least one accelerator or combinations of sulfur and at least one accelerator and optionally a tackifier resin, process oil, lubricants, process aids, and antidegradants. The colored markings are substantially free of organic solvents readily volatile at 100° C. as well as free of water.

The process for applying the one or more colored crosslinkable marking comprises contacting and adhering said carbon black filled rubber composition with one or more colored crosslinkable markings temporarily adhered to at least one releasable material; after said adhesion, removing said at least one releasable material leaving the one or more colored crosslinkable markings adhered to the carbon black filled rubber composition; and desirably thereafter vulcanizing the combination of adhered marking or markings and carbon black filled crosslinkable rubber composition. Desirably the colored markings are applied while the carbon black filled crosslinkable rubber composition is hot, e.g. subsequent to extrusion or molding. Then the carbon black filled rubber composition is cooled with the water spray and eventually assembled into a pneumatic tire as the tread region thereof and then vulcanized.

DETAILED DESCRIPTION

A current practice for marking tire treads for identification purposes is the use of solvent based inks comprising pigments, a binder, and an organic solvent. The process is easily mechanized by mounting the ink in dispensers at predetermined locations following the extrusion or molding of tire treads. The solvent based ink provide good wetting and adhesion to the treads along with fast drying times. The treads are often cooled with the water spray subsequent to marking and then used to assemble tires or packaged and stored for later use. The solvents evaporate and either contaminate the work place or are recaptured in solvent recovery systems. These solvent based inks have limited shelf life as partial crosslinking can often occur during storage. This increases the viscosity and prevents free flow through the capillary of the marker. Often capillaries are clogged causing heavy rework.

An improvement on the above process involves preparing a film type marking or markings of the above colored pigments and a binder which are substantially solvent free on a releasable material and then transferring, by application of pressure and/or heat, the marking or markings to a carbon black filled crosslinkable rubber composition such as a preferred tire tread. The improvement eliminates the solvents in the tire tread forming region, eliminates clogging of the markers, allows for longer storage of the colored marking, removes the need to transport the solvents from the ink manufacture to the tire tread manufacture's facilities, and facilitates capture and recycling of the solvent.

A preferred method of preparing the one or more colored markings on a releasable material is applying the binder and the pigment and other components of the markings from a solvent onto the releasable material. Subsequent to applying by this method the solvent is evaporated and recovered or incinerated. Multiple markings or multiple colors of markings can be applied simultaneously or sequentially or combinations of simultaneously and sequentially. If the exact width of the one or more colored marking is critical they can be trimmed during the preparation process either while they contain solvent or subsequent to solvent removal.

In the preferred embodiment the markings will be monolayer films of uniform color but in other embodiments the markings may be multi-layer or can include other colors applied by dyeing, pigmentation, multi-layers, etc. The markings may be calendered, radiated, processed or otherwise treated prior to being applied to the carbon black filled crosslinkable rubber composition. Preferably the one or more colored crosslinkable markings do not have a separate adhesive layer but rely either on the tack within the binder or the tack of the carbon black filled rubber composition to effect adhesion to the carbon black filled crosslinkable rubber composition.

Capture and recycling of the solvents from tread marking can be facilitated by preparing a solvent-free marking on a release material in a separate facility. Water-based inks (e.g. latex) can also be dried into a colored marking on a release material and used. The preparation as a colored marking substantially free of water and solvents allows the polymer particles to fully coalesce before application to the carbon black filled crosslinkable rubber composition increasing their resistance to washing off. A more enclosed system or fully enclosed system can be used to prepare the one or more markings on the releasable material.

Further, as the markings are desirably very thin and will not flow appreciably during application very precise marking thicknesses and marking spacings can be achieved by preparation of the markings on a releasable material. When these precisely formed markings are properly indexed and applied to a carbon black filled crosslinkable composition they can be precisely located via indexing at any predetermined location on the carbon black crosslinkable rubber composition, e.g. tread, so that the marking can be easily found during manufacturing or on the vulcanized crosslinked pneumatic tire. It is also anticipated that the color of the marking can be more precisely controlled than the color of an ink in the prior application method.

Various flexible releasable materials can be used for the laminate of this invention and their selection is not considered critical so long as the material is flexible and will properly release one or more colored markings If the laminate of the one or more colored marking and the releasable material is to be coiled for storage after preparation of the solvent free marking then an additional layer of releasable material may be used. Optionally the backside of the first releasable material can releasably come into contact with the one or more colored markings instead of using additional release material. If this occurs the backside of the releasable material will need to be of an appropriate material or be coated with an appropriate material so that the one or more colored markings are first released from the back side of the releasable material and later released from the front side of the releasable material.

Representative of such release materials are film, filament or fiber made of polyethylene, polypropylene, polyester, polyacetate, or polyvinylchloride etc. or cotton, paper or polymeric material having a silicone or wax coating thereon. It would be understood by one having skill in the art that such wax or silicone coated material would comprise a wax or silicone which would not transfer to the one or more colored marking. It is considered that a transfer of a wax, silicone or other release compound onto the one or more colored marking would interfere with the adhesion of the colored marking to the carbon black filled rubber composition or foul the mold surface when the carbon black filled crosslinkable rubber composition is finally vulcanized. The releasable material facilitates mechanized application of the colored marking, eliminates many anticipatable problems with the colored marking becoming deformed during the application process, facilitates indexing the location of the one or more colored marking on the carbon black filled rubber composition and facilitates the simultaneous application of the one or more colored marking to a substrate. Desirably the releasable material is recycled or reused after each use. Recycling or reuse can include collecting the releasable material on a roll for direct reuse. Alternatively one or more recycling steps can be used where the releasable material is converted back into one or more base components. These base components can then be used for making additional releasable material or another polymer product.

The one or more colored crosslinkable markings are desirably very thin films such as from about 0.1 to about 10 mil thick (0.0025 mm to 0.254 mm), more desirably from about 0.4 to about 4 mil thick, and preferably from about 0.3 to about 1 mil thick. Thickness is important because if the colored markings are too thick there is more of a tendency for the colored markings to foul molding surfaces during subsequent vulcanization of the carbon black filled crosslinkable rubber composition (pneumatic tire). Further, as the carbon black filled crosslinkable rubber compositions are usually formulated for specific purposes, one does not want to replace too much of the carbon black filled crosslinkable rubber composition in the final application. The width of the one or more colored markings is desirably from about 0.254 mm to about 50.8 mm wide. The width of the colored marking for identification purposes should be desirably from about 0.508 mm to about 6.35 mm wide, and preferably from about 0.762 mm to about 5.08 mm wide. The width of the colored marking for coloring the aquachannel of Aquatred® tires for aesthetic purposes should be wider for easy visibility and preferably in the range from about 1 mm to about 50 mm and preferably from about 3 mm to about 40 mm. Width is important for the marking due to the visibility of the marking during tire manufacturing and visibility for subsequent inspection of the cured tire. Depending on the consumer interest it may be desirable to limit the visibility of the tread marking after vulcanization.

The one or more colored markings desirably comprise 1) natural rubber and/or at least one synthetic diene or isobutylene based elastomer or combinations thereof, 2) at least one colored pigment, and 3) sulfur or at least accelerator or combinations of sulfur and at least one accelerator and optionally 4) tackifier resin, and 5) process oil. The composition of the one or more colored markings is very similar to the carbon black filled crosslinkable rubber composition except trace or no carbon black is used so that they can have a contrasting color to the carbon black filled crosslinkable rubber composition. Alternatively the marking composition can be a pigmented tire whitewall composition based on a halobutyl rubber, EPDM polymer, natural rubber, brominated isobutylene-para-methylstyrene copolymer or combinations thereof. It is desirable that the one or more colored crosslinkable markings have less than 1 phr and more desirably less than 0.5 or 0.1 phr of carbon black therein.

One or more colored markings on a releasable material with an intervening space between each colored marking can be used, or to minimize inventory of the combinations of colored markings, each marking can be individually applied to the carbon black filled crosslinkable rubber composition to create combinations of colored markings. As a practical matter it is usually desirably to limit the number of colored markings to four or less. Desirably each colored marking transfers to the hot carbon black filled rubber composition on contact. The hot carbon black filled rubber composition can have good tack especially due to it being hot.

It is also desirable that the one or more colored markings be substantially free of organic solvents which are readily volatile at 100° C. Desirably the colored markings are substantially free of water. For the purpose of this specification "substantially free of" is defined as less than about 5 weight percent, more desirably less than about 3 weight percent, still more desirably less than about 2 weight percent and preferably less than 1 weight percent. Organic solvents are defined as organic compounds that would evaporate at a rate of 10 weight percent per hour when spread as a thin layer maintained at 100° C. and one atmosphere pressure. Thus it excludes higher molecular weight materials which may be process oils in a rubber composition, but includes common organic solvents such as acetone, hexane, isopropyl alcohol, butyl alcohol, etc.

Desirably the one or more colored crosslinkable markings are applied at specific locations on the carbon black filled crosslinkable rubber composition. The application at specific locations can be achieved by indexing the one or more colored markings with respect to the carbon black filled crosslinkable rubber composition. Usually the one or more colored markings are applied longitudinally along the carbon black filled crosslinkable rubber composition (e.g. tire tread) and may be placed at a predetermined distance from the center line of the tread or from the left or right edge of the tread. Typically the one or more colored markings are applied on an outside surface of the tread such that the one or more colored markings will be visible on the exterior of the tire when the tread is wrapped around a tire carcass and vulcanized into a cured pneumatic tire.

Indexing can be achieved by a means for indexing the location of one or more of the one or more colored crosslinkable markings in relationship to the carbon black filled crosslinkable rubber composition. These means can include a detection means such as photoelectric eyes, lasers, light sources and calibrated laser light sensors to detect the distance the laser light has traveled etc. used in combination with indexing adjusters such as hydraulic valves, cylinders, calibratable drive motors, etc. which would move the marking(s) in relationship to the carbon black filled crosslinkable rubber composition or move the carbon black filled crosslinkable rubber composition with respect to the one or more colored markings to adjust the location of application of the one or more colored markings to a specific predetermined location on the carbon black filled crosslinkable rubber composition.

The carbon black filled crosslinkable rubber composition is preferably a tire tread. Tire tread are conventionally black due to the inclusion of substantial amounts of a high surface area, high tint strength, carbon black to impart desirable wear properties to the tread region. Conventional tire tread compositions comprise natural rubber or at least one synthetic diene based elastomer or combinations of natural rubber and at least one synthetic diene based elastomers. Synthetic diene based elastomers can include homopolymers, copolymers and polymers from three, four or more different monomers. Ethylene-propylene-diene (EPDM) polymers and butyl rubber including halobutyl rubber and brominated copolymers from isobutylene and para-methylstyrene can be used in minor amounts. For the purpose of this specification the amount of other components within the carbon black filled crosslinkable rubber composition will be based on parts by weight per 100 parts total rubber (phr) which shall comprise the natural rubber if present, the at least one synthetic diene based elastomer if present, and the EPDM and/or butyl rubber if present. The synthetic diene based elastomer will comprise polymers having at least 30 weight percent repeat units from one or more conjugated dienes having from 4 to 8 carbon atoms and more desirably at least 50 or 60 weight percent of the repeat units from said conjugated diene monomers. Examples of homopolymers and copolymers include polybutadiene rubber, isoprene rubber, and styrene-butadiene rubber. Examples of terpolymers include styrene-isoprene-butadiene terpolymers. Ethylene-propylene-diene polymers comprise a major amount of ethylene and propylene monomers, e.g at least 90 weight percent, and minor amounts of repeat units from a polyolefin desirably a non-conjugated polyolefin having from 4 to 25 carbon atoms.

Carbon black is an important component of carbon black filled crosslinkable rubber compositions. Desirably the carbon black is a high structure black such as a high abrasion furnace, super high abrasion furnace or intermediate super abrasion furnace carbon black. Desirably the carbon black is present from about 30 to about 90 phr, more desirably from about 35 to about 80 phr and preferably from about 45 to about 70 phr. The carbon black is desirably selected from those having ASTM tint values as a percent of the industry tint reference black (ITRB) of from about 80 to about 150 and more desirably from about 90 to about 130. These tint values are associated with carbon blacks having a weight average particle diameter for the ultimate black particles of from about 15 to about 50 nanometers in diameter.

The oil in the carbon black filled rubber composition is desirably from about 1 to about 50 phr. The sulfur or at least one accelerator or combinations of sulfur and accelerators is desirably from about 0.5 to about 10 phr and more desirably from about 1 to about 8 phr. The carbon black filled rubber composition also optionally includes one or more silicas, one or more processing aids and one or more antioxidants, antiozonants, and other environmental protectorants for the rubber composition.

The rubber component in the one or more colored crosslinkable markings is desirably natural rubber or at least one synthetic diene or isobutylene based elastomer or combinations of said natural rubber and synthetic diene or isobutylene based elastomers. The term synthetic diene based elastomer will be defined as comprising at least 30 weight percent of repeat units from one or more conjugated dienes having from 4 to 8 carbon atoms, more desirably the synthetic diene based elastomers comprise at least 40 or 50 weight percent of repeat units derived from polymerization of these monomers. Examples are polybutadiene rubber (including high vinyl, low vinyl, high cis, etc.); synthetic isoprene rubber (including high cis,1–4); copolymers of 3 or more different monomers such as terpolymers of styrene-isoprene-butadiene monomers as is often used in tire components. The isobutylene based elastomer may be butyl rubber, bromo or chlorobutyl rubber or a brominated isobutylene-para-methylstyrene copolymer or combinations thereof. For the purpose of defining the components of the one or more colored crosslinkable markings all components will be based upon parts by weight per 100 parts by weight of the total rubbers listed above.

The one or more colored pigment can be any of the conventional pigments used to pigment polymer compositions and previously used in the inks used to mark tire tread compositions. Colored markings will be defined to only exclude black and to include white pigment since white can be a color and white pigments helps intensify the color from other pigments such as yellow, red, blue pigments, etc. The amount of the one or more colored pigments is desirably from about 0.2 to about 100, 120 or 200 phr and more desirably from about 20 to about 100 phr. Dyes can be used in combination with the pigments but for the purpose of this specification pigments and dyes will be considered as separate entities. Dyes are usually defined as soluble organic or inorganic compounds while pigments are conventionally defined as particulate colored compounds which are not soluble in rubber but are dispersible in rubber or polymeric compounds. Pigments are more desirable in this application as they are less mobile in polymer compositions (e.g. don't migrate) and tend to impart more vibrant colors than dyes.

The one or more colored markings can include tackifier resins in amounts from about 0 to about 10 phr. The one or more colored markings can also desirably include one or more process oils in amounts from about 0 to about 10 phr. Process oils are typically defined as aromatic or paraffinic oils.

The one or more colored crosslinkable markings also include sulfur or at least one accelerator or combinations of sulfur and accelerator. Sulfur is a common additive to crosslinkable compositions. Accelerators are also well known and conventional to rubber compounding. Preferred accelerators for the one or more markings are the same accelerators as used in tire treads. Desirable amounts of these accelerators are from about 0.2 to about 10 phr, more desirably from about 0.3 to about 8 phr. Desirable amounts of sulfur is from about 0.1 to about 4, more desirably from about 0.2 to about 3 phr.

The most convenient spot to apply the one or more colored crosslinkable markings to the carbon black filled crosslinkable rubber composition is shortly after extrusion or molding of the carbon black filled crosslinkable rubber composition, e.g. tire tread. The carbon black filled crosslinkable rubber composition is still fairly hot, for example desirably from about 40° C. to about 135° C., more desirably from about 50° C. to about 125° C. when the one or more colored crosslinkable markings are applied thereto.

The one or more colored crosslinkable markings are applied by contacting the one or more colored crosslinkable markings to the carbon black filled crosslinkable rubber composition with the releasable material still attached to the one or more colored crosslinkable markings. The one or more colored crosslinkable markings are then more securely adhered to the carbon black filled crosslinkable rubber composition. This can be achieved by temperature differentials between the one or more colored crosslinkable markings and the carbon black filled crosslinkable rubber composition, or the application of pressure from a roller pressing on the releasable material or the application of pressure from another source on the releasable material, or the passing of time from the initial application or combinations thereof. At some point in the application of the one or more markings to the carbon black filled crosslinkable rubber composition the releasable material is removed from both the one or more colored crosslinkable marking and the carbon black filled crosslinkable rubber composition. At some point in the process, desirably after removal of the releasable material, the carbon black filled crosslinkable rubber composition is cooled so that premature vulcanization does not occur during storage. A preferred method of cooling is the application of a water spray optionally containing other components, such as zinc stearate or talcum powder, to treat the rubber.

After the carbon black filled crosslinkable rubber composition is cooled to an appropriate temperature it can be further sized and shaped for use in building tires or it can be packaged and stored, often including rolling the tread with appropriate protective layers and releasable materials, for subsequent use. Subsequent to using the carbon black filled crosslinkable rubber composition, e.g. tread, in building tire, the entire laminate (comprising the carbon black filled crosslinkable rubber composition and adhered one or more colored marking) is vulcanized in an appropriate cure assembly. For conventional tire vulcanization this is a tire press comprising an inflatable bladder and one or more sections of rigid tire molding surfaces which interact to shape and cure of a pneumatic tire.

The following examples illustrate how one or more colored crosslinkable rubber markings can be applied to a carbon black filled crosslinkable rubber composition.

EXAMPLES

A yellow tire tread marking compound was obtained from Akron Paint and Varnish, Inc., Akron, Ohio and coated onto release materials below and the solvent was evaporated. The release materials were:

a) mylar film
b) polyethylene film
c) silicon release paper
d) poly(vinyl chloride) film.

The process of forming and marking a tire tread component was simulated by compressing a sample of tire tread compound ($1.59 \times 10^{-5} m^3$, 35 g) in a 15.2×15.2×02.07 cm mold at 93° C. under 22,700 kg force for 5 minutes between two mylar films. While the molded specimen was still hot the mylar film on one side was removed and the yellow colored marking on the releasable materials from above, (essentially solvent free) was applied with the yellow colored marking touching the tire tread compound. The releasable material with the yellow colored marking was pressed with a small hand held roller and then the releasable material was removed leaving the transferred yellow marking on the tread. The colored marking formed a yellow-line on the tread compound which remained even after curing for 15 minutes at 154° C. under 22,700 kg pressure in the presence of Mono Coat™ 294W mold release agent. Thus, the possibility of adhering a thin film of colored marking without solvent to a tread compound was demonstrated.

A yellow tread marking ink D-4880 from Akron Paint and Varnish, Inc., Akron, Ohio, was coated on one side of a Nylon-6,6 monofilament and then the coating was allowed to dry. The coated side was pressed against a light truck tire tread compound that was at 121° C. The colored marking transferred from the monofilament to the tread. A water washing of the tire tread did not remove the marking (i.e. the marking was water resistant). The color also survived curing at 149° C. for 45 minutes at 0.69 MPa (100 psi).

To illustrate the use of a tread marking compound high in butyl rubber content a white sidewall compound was used as a tread marking. A white sidewall compound (412 g) as shown in Table I was blended with 185 g of ZQ17 yellow (available from Dayglo Corporation, Akron, Ohio) on a two roll mill heated to 80° C. The colored sidewall compound was pressed between two release papers to form a thin film. A strip of the thin film was transferred from a releasable backing material to a tread compound. The marked tread compound was then cured at 150° C. for 20 minutes under 22,700 kg of force yielding a marked vulcanized article.

TABLE I

| White Sidewall Formulation | | |
|---|---|---|
| Natural Rubber | 35 | parts by weight |
| Chlorobutyl rubber and EPDM | 65 | |
| Clay and $TiO_2$ | 85 | |
| Processing aids | 7.5 | |
| Fatty acid | 1 | |
| Mix well in an intensive mixer such as two roll mill, Banbury, or Brabender | | |
| Sulfur | 1.2 | parts by weight |
| Sulfur accelerators | 2.0 | |
| Zinc oxide | 5 | |
| Antidegradant | 1 | |
| Further mix in an intensive mixer | | |
| Total | 202.7 | |

Four water-based tread marking inks were obtained form Matthews International Corp., Pittsburgh, Pa. and converted into solventless tread markings. The inks were M394 blue curable (WB) ink 10296-905-05; M-394 yellow curable (WB) ink 10296-923-05; LS072296Z white (WB) striping ink; and M-394 white curable (WB) ink 10296-920-05. The flexible backing on which the inks were dried were either silicone release coated paper, Mylar™ film, or flat nylon filament (0.0276" 0.701 mm) from Shakespeare Monofilament in North Carolina. The solventless markings from the inks were transferred from the releasable materials to a tread rubber compound. Then the marked tread rubber compound was cured at 149° C. for 28 minutes under pressure. Generally all the markings released well from the releasable material. It was noted that the white colored markings (possibly due to partial crosslinking released poorly from the Mylar™ film.

While in accordance with the patent statutes the best mode and preferred embodiment has been set forth, the scope of the invention is not limited thereto, but rather by the scope of the attached claims.

What is claimed is:

1. A process for identifying a carbon black filled crosslinkable tread rubber composition, comprising:
   a) contacting and adhering one or more colored crosslinkable markings temporarily adhered to at least one releasable material to said carbon black filled crosslinkable tread rubber composition wherein said carbon black filled rubber is at a temperature from about 40° C. to about 135° C. when said one or more colored crosslinkable markings are applied thereto;
   b) subsequent to adhering, removing said at least one releasable material leaving said one or more colored crosslinkable markings adhered to said carbon black filled crosslinkable rubber; and
   c) after removing said releasable material vulcanizing said one or more colored crosslinkable markings and said carbon black filled crosslinkable rubber in a suitable mold, wherein said one or more colored crosslinkable markings have a thickness from about 0.1 to about 10 mil and a width of about 0.508 mm to about 6.35 mm, have less than 1 phr of carbon black, and are substantially free of organic solvents readily volatile at 100° C. and water, and wherein said carbon black filled crosslinkable rubber composition comprises natural rubber or at least one synthetic diene based elastomer or combinations of natural rubber and said synthetic elastomer, from about 30 to about 90 phr of carbon black, and sulfur or at least one accelerator or combinations of sulfur and at least one accelerator.

2. A process according to claim 1, wherein said one or more colored crosslinkable markings comprise:
   1) natural rubber, or at least one synthetic diene and/or isobutylene based elastomer or combinations of natural rubber and said at least one synthetic elastomer;
   2) at least one colored pigment; and
   3) sulfur or at least one accelerator or combinations thereof.

3. A process according to claim 2, wherein said carbon black filled rubber composition and said one or more colored crosslinkable markings adhered thereto are subjected to a water cooling step prior to said vulcanizing step.

4. A process according to claim 3, including assembling said tire tread as part of a pneumatic tire prior to said vulcanizing step.

5. A process according to claim 4, wherein said one or more colored crosslinkable markings are adhered to said carbon black filled rubber composition at a predetermined location by use of an indexing means.

6. In a process of manufacturing a tire by applying a pre-shaped strip of an unvulcanized tread rubber composition to a rubber tire carcass and vulcanizing the resulting tire/tread assembly in a suitable mold at an elevated temperature, wherein said tread rubber is a carbon black reinforced, vulcanizable rubber composition which contains from about 30 to about 90 phr of carbon black; an improvement which comprises;
   a) applying a thin vulcanizable elastomer-based composition which is substantially free of water and organic solvent readily volatile at 100 degrees C., to a surface of said pre-shaped tread rubber composition prior to applying said tread rubber composition to said carcass, wherein (1) said thin elastomer-based composition is applied to said surface of said tread rubber composition as a laminate of said elastomer-based composition on a releasable backing while said rubber composition is at an elevated temperature in a range of about 40° C. to about 135° C., and wherein (2) said applied thin elastomer-based composition has a color contrasting to the color of said tire tread rubber composition,
   b) removing said releasable backing from said applied thin elastomer-based composition,
   c) subjecting the resulting tread rubber composition to water cooling treatment,
   d) applying the resulting unvulcanized tread rubber composition to a rubber tire carcass and
   e) vulcanizing the resulting tire/tread assembly in a suitable mold at an elevated temperature, wherein said contrasting colored, vulcanized elastomer-based composition on the surface of said tread has a thickness in a range of about 0.1 to about 10 mil and a width in a range of about 0.508 to about 6.35 mm.

* * * * *